US012115541B2

(12) United States Patent
Lu et al.

(10) Patent No.: US 12,115,541 B2
(45) Date of Patent: Oct. 15, 2024

(54) WATER-SAVING DYNAMIC WATER OUTLET DEVICE

(71) Applicant: Xiamen EASO Co., Ltd., Xiamen (CN)

(72) Inventors: Hai Tao Lu, Xiamen (CN); Hua Shan Xu, Xiamen (CN); Zhen Li, Xiamen (CN); Xi Min Chen, Xiamen (CN)

(73) Assignee: Xiamen EASO Co., Ltd.

( * ) Notice: Subject to any disclaimer, the term of this patent is extended or adjusted under 35 U.S.C. 154(b) by 425 days.

(21) Appl. No.: 17/306,984

(22) Filed: May 4, 2021

(65) Prior Publication Data

US 2022/0203384 A1 Jun. 30, 2022

(30) Foreign Application Priority Data

Dec. 24, 2020 (CN) ........................ 202011551420.0

(51) Int. Cl.

*B05B 1/18* (2006.01)
*B05B 1/08* (2006.01)
*B05B 1/16* (2006.01)
*B05B 3/04* (2006.01)

(52) U.S. Cl.

CPC ................ *B05B 1/18* (2013.01); *B05B 1/083* (2013.01); *B05B 1/16* (2013.01); *B05B 3/0418* (2013.01)

(58) Field of Classification Search

CPC .. B05B 1/083; B05B 1/16; B05B 1/18; B05B 3/04; B05B 3/0418; B05B 3/14
See application file for complete search history.

(56) References Cited

U.S. PATENT DOCUMENTS 11,583,872 B2 * 2/2023 Hong .................... B05B 3/0418
2010/0259048 A1 * 10/2010 Smith ..................... F03B 13/10 60/496
2010/0283248 A1 * 11/2010 Moffat ................ H02K 7/1823 290/52
2013/0200627 A1 * 8/2013 Deng ..................... F03B 13/20 290/53
2017/0274395 A1 * 9/2017 Xu ............................ B05B 3/04
2018/0058419 A1 * 3/2018 Liao .................... F03B 13/1815

* cited by examiner

*Primary Examiner* — Shafiq Mian
(74) *Attorney, Agent, or Firm* — Jose Cherson Weissbrot

(57) ABSTRACT

The present invention discloses a water-saving dynamic water outlet device, which comprising a base, an inclined water body, a swinging water assembly, an impeller assembly and a driving assembly, the inclined water body is connected with the base to form a cavity, the cavity is provided with a water outlet, the impeller assembly is arranged in the cavity, and the driving assembly can drive the swinging water assembly to swing in a reciprocating manner under the driving of the impeller assembly; the swinging water assembly is installed on the base and can swing in the base, a water passing chamber is formed in the swinging assembly, and a water passing port is formed in the side face of the swinging assembly, the water outlet is communicated with the water passing port through a communicating channel, and the plane where the water outlet is located and the plane where the water outlet is located are arranged non-parallel. The water-saving dynamic water outlet device has a good water-saving effect, and enables the user to have a sweeping impact massage feeling when using it, and with strong comfort.

10 Claims, 4 Drawing Sheets

WATER-SAVING DYNAMIC WATER OUTLET DEVICE

FIELD AND BACKGROUND OF THE INVENTION

Technical Field

The present invention relates to a water-saving dynamic water outlet device.

Background

With the increasing shortage of the global water resources, the water-saving and environment-friendly products gradually become the mainstream trend of consumption. Various types of water-saving products appear on the market, which the flow is reduced mainly by adding a flow restrictor at a water inlet end, but in this way, the number of water outlets remains unchanged and the flow decreases, resulting in weaker splashes and poor shower effects; if the flow rate is reduced and the number of the water outlet holes is reduced at the same time, the coverage area is small and the water bloom is sparse.

Most of the existing massage shower heads on the market are: the water outlet holes are regularly covered by the rotation of the impeller, so that the water outlet effect can reach the gap water. When the shower is used, there is a pulse feeling on the body to achieve the massage effect, but this pulse feeling not very obvious.

DISCLOSURE OF INVENTION

In order to solve the technical problems, the present invention aims to provide a water-saving dynamic water outlet device.

The present invention is realized by the following technical scheme: a water-saving dynamic water outlet device, which comprising a base, an inclined water body, a swinging water assembly, an impeller assembly and a driving assembly, the inclined water body is connected with the base to form a cavity, the cavity is provided with a water outlet, the impeller assembly is arranged in the cavity, and the driving assembly can drive the swinging water assembly to swing in a reciprocating manner under the driving of the impeller assembly; the swinging water assembly is installed on the base and can swing in the base, a water passing chamber is formed in the swinging assembly, and a water passing port is formed in the side face of the swinging water assembly, the water outlet is communicated with the water passing port through a communicating channel, and an angle is formed between a central lines of the water outlet and a centerline of the water passing port.

Preferably, the swinging water assembly comprises a swinging surface cover and a swinging water nozzle, and the swinging surface cover and the swinging water nozzle are mutually sealed and fixed to each other to form the water passing chamber.

Preferably, the driving assembly comprises a gear and an eccentric shaft, the gear is engaged with the impeller assembly, the bottom end of the eccentric shaft is provided with a convex column; the upper surface of the swinging surface cover is provided with a sliding groove, and the convex column is matched with the sliding groove to drive the swinging water assembly to swing in a reciprocating manner.

Preferably, a sealing washer is sleeved in the outside of the eccentric shaft, the base is provided with a sinking groove, and the sealing washer is arranged in the sinking groove and then is in sealing fit with the base.

Preferably, a profiled sealing ring is sleeved in the outside of the water passing port.

Preferably, the profiled sealing ring is a profiled O-ring.

Preferably, the cavity is located above the swinging water assembly, and the water passing port is opened on the side surface of the swinging water assembly.

Preferably, the communicating channel is an inclined channel.

Preferably, the end of the swinging water assembly having the water passing port is connected to the base, and the other end of the swinging water assembly is fixed to the base by a fixing plug.

Preferably, the fixing plug is provided with an accommodating cavity and a locking hole, the swinging water assembly is inserted into the accommodating cavity, and the locking hole is connected with the base by screws.

The water-saving dynamic water outlet device drives the swinging water assembly to swing in a reciprocating manner through the impeller assembly and the driving assembly to form the swing water flower, which has good water-saving effect and enables the user to have a sweeping impact massage feeling when using, and has strong comfort; secondly, under the same water outlet area, the shower range of the water outlet device is larger after using, and the water-saving effect is achieved; moreover, the communication between the cavity and the water outlet is not up and down, and the profiled sealing ring is sleeved in the outside of the water passing port, which the arrangement direction of the profiled sealing ring is consistent with the left-right swinging direction of the swinging water assembly, so that the risk of water leakage can be greatly reduced, and has strong reliability.

DRAWINGS

In order to more clearly illustrate the technical solution of the present invention, the drawings used in the embodiments or the prior art descriptions will be briefly introduced below, and it is obvious that the drawings in the following description are only some embodiments of the present invention, and other drawings can be obtained by those skilled in the art without inventive efforts.

DETAILED DESCRIPTION

Figure 1:
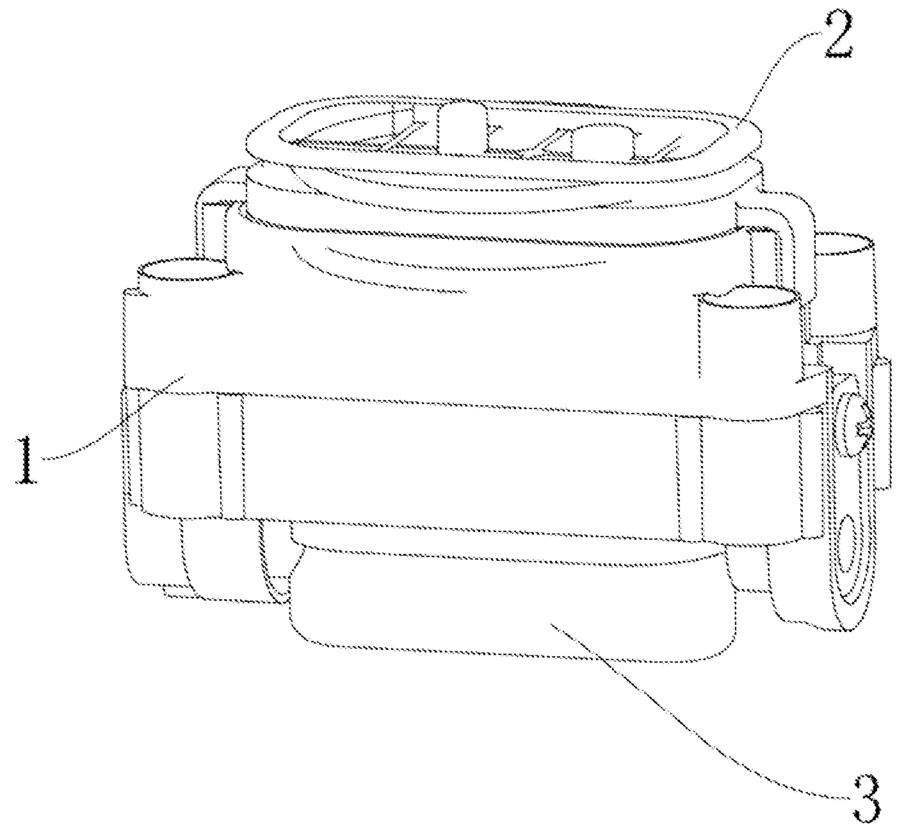
FIGS. 1 and 2 are perspective views of the present invention.
Figure 2:
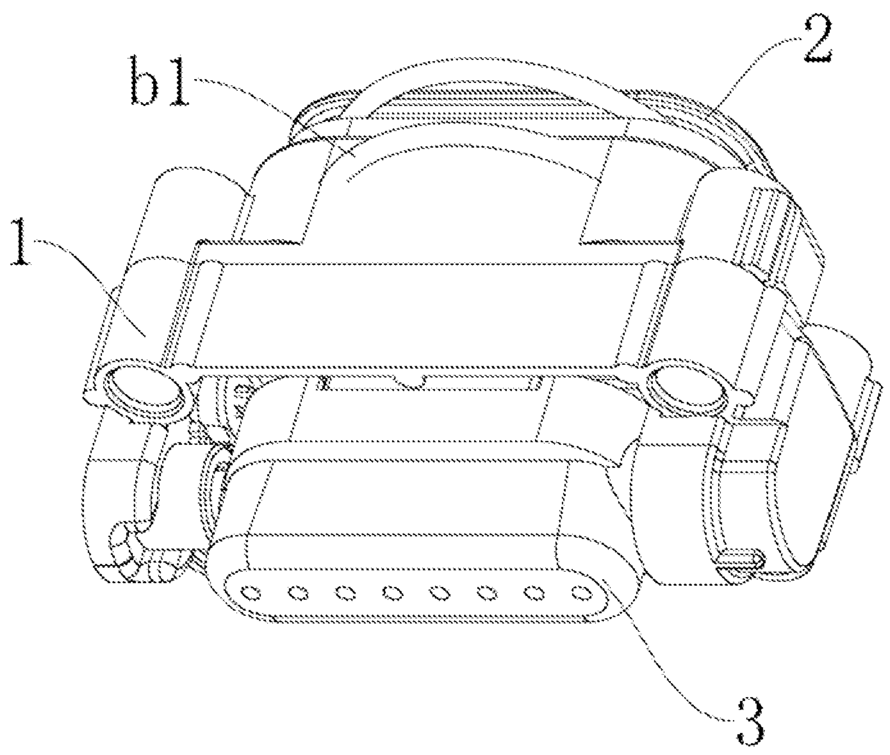
Figure 3:
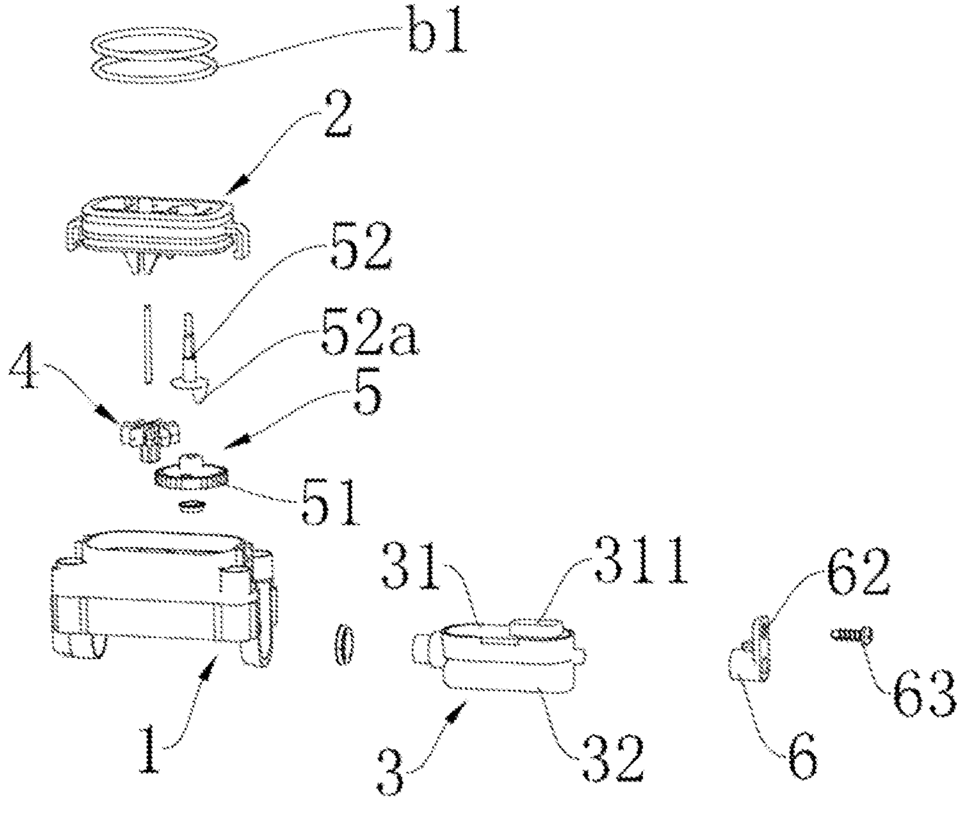
FIGS. 3 and 4 are exploded views of the present invention.
Figure 4:
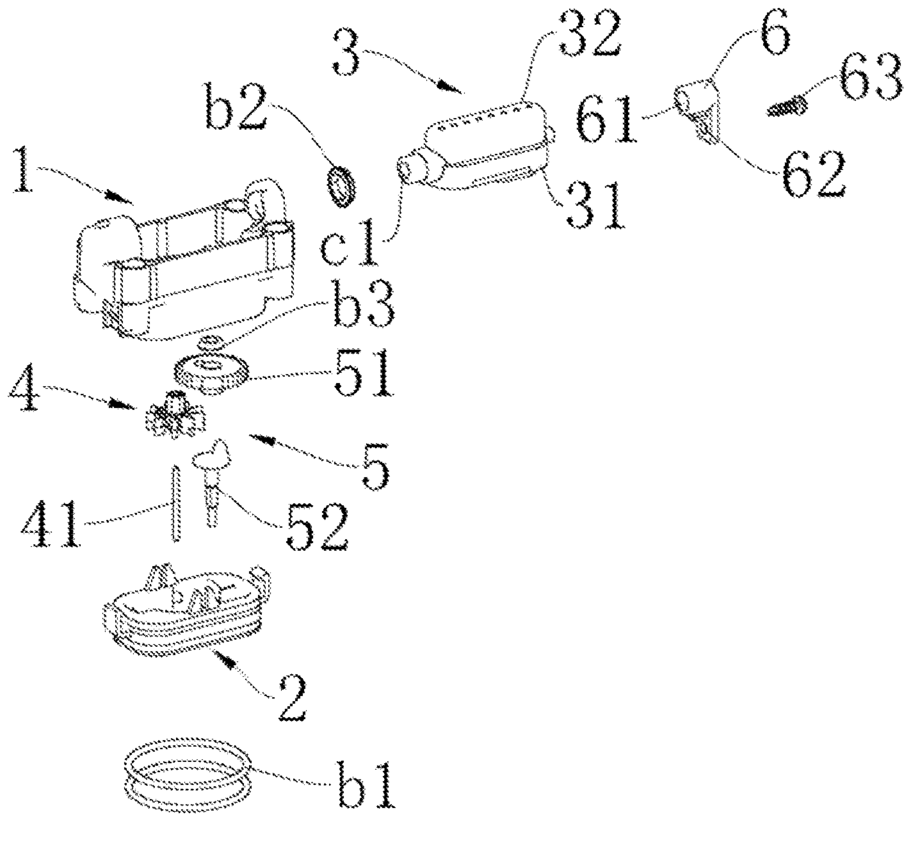
Figure 5:
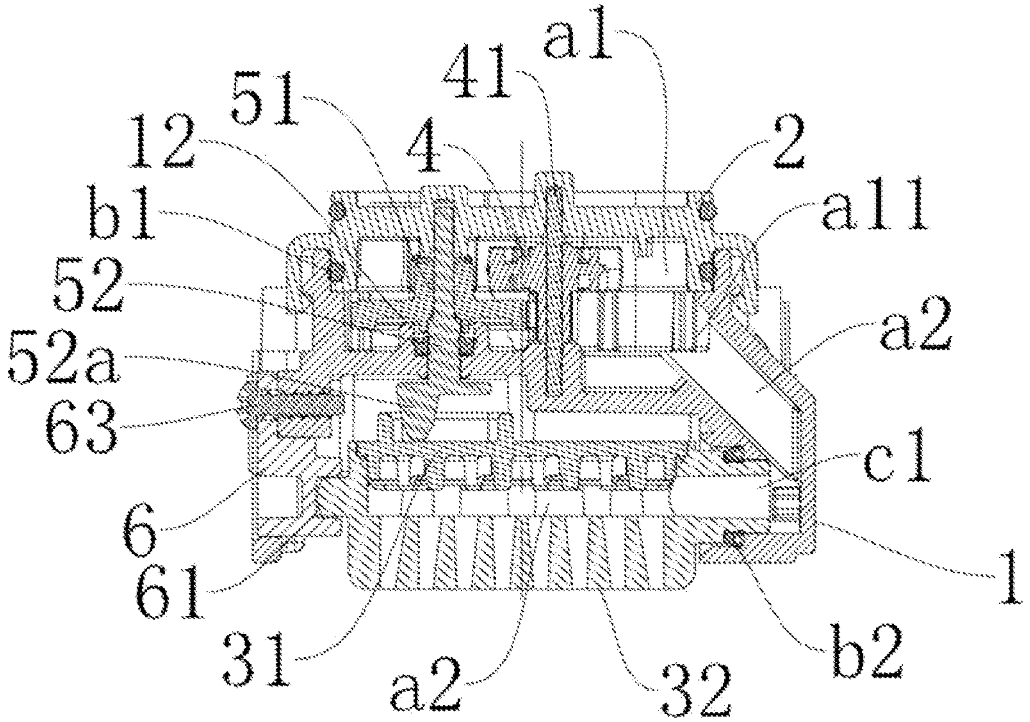
FIG. 5 is a cross-sectional view of the present invention.

The technical solutions in the embodiments of the present invention will be clearly and completely described below with reference to the drawings in the embodiments of the present invention, and it is obvious that the described embodiments are only a part of the embodiments of the present invention, and not all of the embodiments. All other embodiments, which can be derived by a person skilled in the art from the embodiments of the present invention without making any creative effort, shall fall within the protection scope of the present invention.

Referring to the attached drawings 1 to 7 of the specification, the water-saving dynamic water outlet device comprises a base 1, an inclined water body 2, a swinging water assembly 3, an impeller assembly 4 and a driving assembly 5, wherein the inclined water body 2 is connected with the base 1 to form a cavity a1, and a sealing ring b1 is sleeved between the inclined water body 2 and the base 1 to ensure the sealing performance of the connection of the inclined water body 2 and the base 1; the impeller subassembly 4 is arranged in the cavity a1, and the inclined water body 2 is provided with an inclined water hole, when water enters from the inclined water hole, it can impact the impeller assembly 4 and drive the impeller assembly to rotate.

The swinging water assembly 3 comprises a swinging surface cover 31 and a swinging water nozzle 32 which are connected up and down, the swinging surface cover 31 and the swinging water nozzle 32 are scaled and fixed to form a water passing chamber a2, the upper surface of the swinging surface cover 31 which far away from the water passing chamber a2 is provided with a sliding groove 311, and the side edge of the swinging water assembly 3 is also provided with a water passing port c1, which is communicated with the water passing chamber a2; a profiled sealing ring b2 is sleeved between the outside of the water passing port c1 and the base 1, and the direction of the profiled sealing ring b2 is consistent with the swinging direction of the swinging water assembly, and preferably, the the profiled sealing ring b2 is a profiled O-ring; the communication between the water outlet all of the cavity a1 and the water passing port c1 is in a non-facing up and down communication relationship, the water passing port c1 is arranged on the side surface of the swinging water assembly 3, the cavity a1 is arranged above the swinging water assembly 3, and a communication channel a2 is arranged between the cavity a1 and the water passing port c1 for communication, that is, the water outlet all of the cavity a1 and the water passing port c1 are not arranged facing each other, the central lines of the water outlet all and the central lines of the water passing port c1 are arranged in a non-parallel manner, and an included angle is formed between the two, or the plane where the water outlet and the water passing port are located has an angle instead of being arranged in parallel. This design method makes the profiled sealing ring b2 which used in the above structure is a profiled sealing ring with a smaller diameter, and the direction of the profiled sealing ring is consistent with the swinging direction, so that can greatly reduce the risk of water leakage between components, and improve the service life of each component, preferably, the communication channel a2 is an inclined channel, which communicates the water passing port c1 on the side surface of the swinging water assembly with the cavity a1 above the swinging water assembly, so that the sealing performance of connection between the assemblies is ensured. Furthermore, the end of the swinging water assembly 3 having the water passing port is connected to the base 1, and the other end of the swinging water assembly is fixed to the base 1 by a fixing plug 6, and the swinging water assembly 3 can swing in the base 1; specifically, the fixing plug 6 has a accommodating cavity 61 and a locking hole 62, the swinging water assembly 3 is inserted into the accommodating cavity 61, and a screw 63 sequentially passes through the locking hole 62 and the base 1 to fix the swinging water assembly to the base 1.

Figure 6:
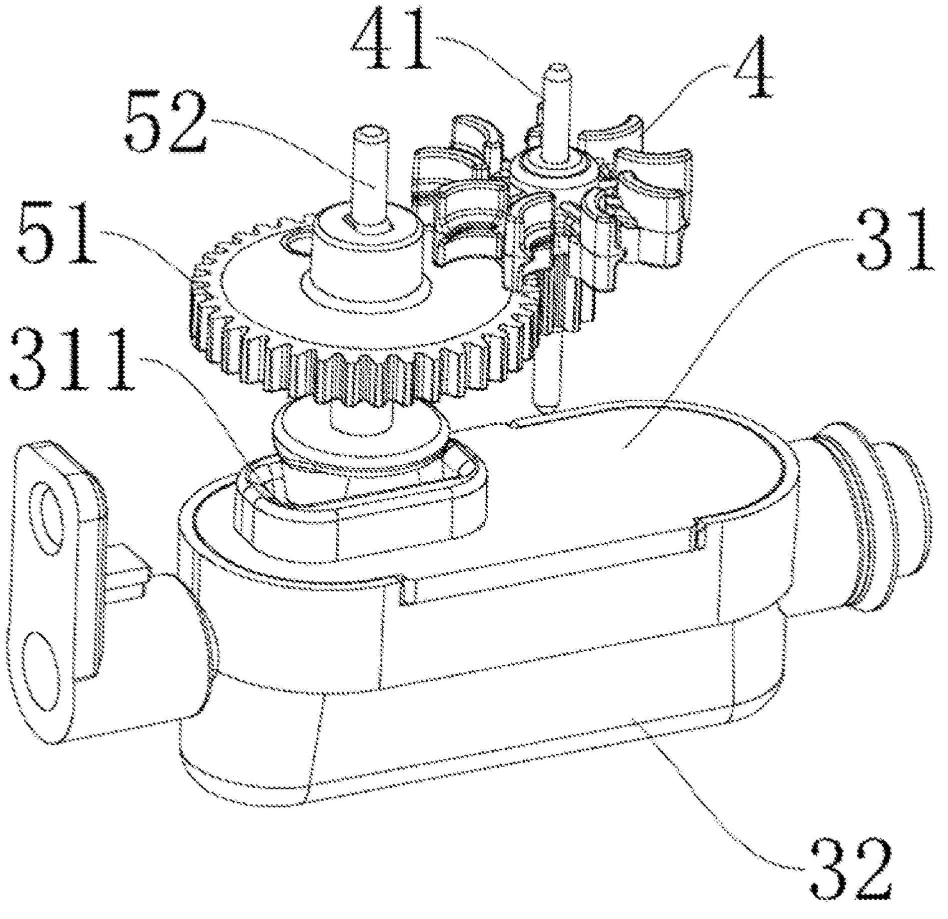
FIG. 6 is a partial perspective view of the present invention.

Referring to FIG. 6 of the specification, the impeller assembly 4 is mounted in the cavity a1 by a bolt 41 in the center of the impeller assembly 4, and one end of the bolt 41 is mounted on the inclined water body 2, and the other end of the bolt is mounted on the base 1, the impeller assembly 4 can rotate around the bolt 41 under the impact of the water flowing in the inclined water hole. The driving assembly 5 comprises a gear 51 and an eccentric shaft 52, the gear 51 penetrates through the eccentric shaft 52, the gear 51 can drive the eccentric shaft 52 to rotate, and the gear 51 is meshed with the impeller assembly 4, so that the impeller assembly 4 drives the gear 51 to rotate, which can ensure that the water outlet device can run smoothly in a high-pressure or low-pressure state; the bottom end of the eccentric shaft 52 is provided with a convex column 52*a*, and the convex column 52*a* is matched with the sliding groove 311 of the swinging surface cover to drive the swinging water assembly to swing in a reciprocating manner; one end of the eccentric shaft 52 is installed on the inclined water body 2, and the other end of the eccentric shaft passes through the base 1 and is matched with the swing surface cover to drive the swing water assembly to swing left and right; preferably, a sealing washer b3 is sleeved in the outside of the eccentric shaft 52, the base 1 is provided with a sinking groove 12, and the sealing washer b3 is arranged in the sinking groove 12 and then is in sealing fit with the base 1, and the sealing washer b3 is a profiled O-ring.

Figure 7:
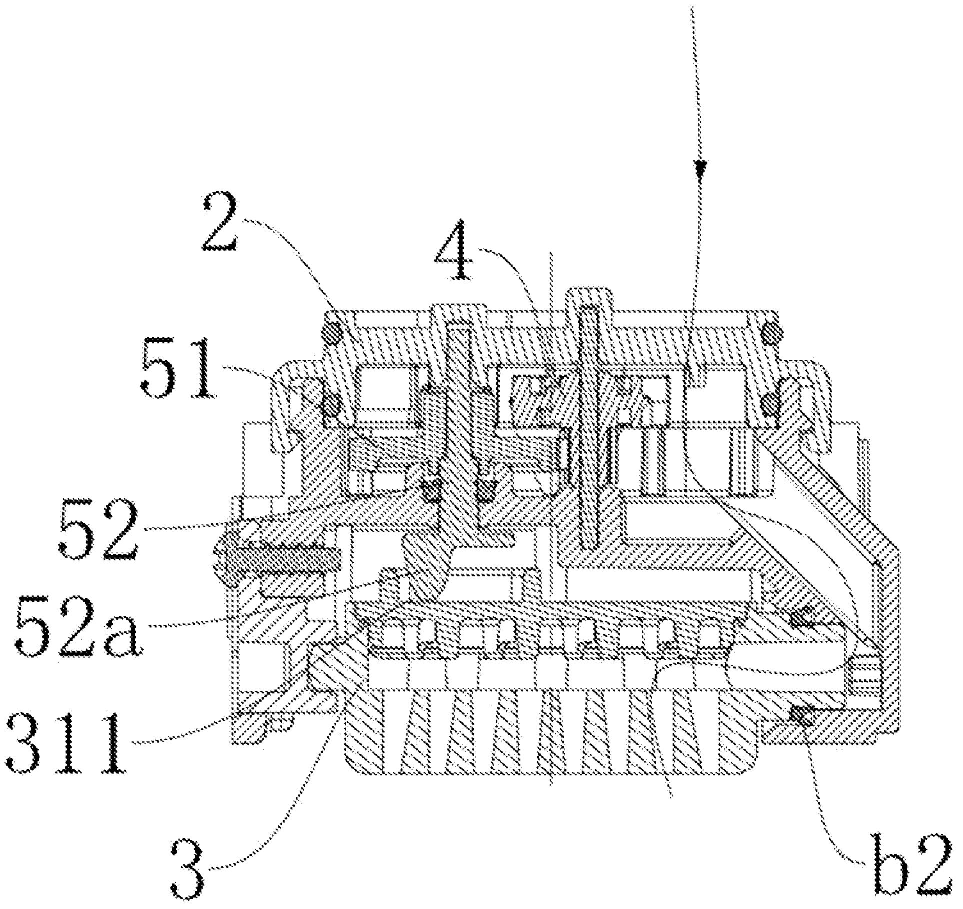
FIG. 7 is a schematic view of the waterway of the present invention.

Referring to FIG. 7, when water flows into the cavity a1 from the inclined water hole of the inclined water body 2, it can impact the impeller assembly 4, and the impeller assembly 4 cooperates with the gear 51 to drive the eccentric shaft 52 to rotate, the convex column 52*a* at the bottom end of the eccentric shaft 52 cooperates with the sliding groove 311 of the swinging surface cover to drive the swing water assembly 3 to swing back and forth, so as to form a sweeping effect, which makes the user have a sweeping impact massage feeling when using.

While the foregoing specification illustrates and describes the preferred embodiments of the present invention, it is to be understood that the invention is not limited to the precise forms disclosed herein and is not to be interpreted as excluding the existence of additional embodiments that are also intended to be encompassed by the present invention as modified within the spirit and scope of the invention as described herein. And that modifications and variations may be effected by those skilled in the art without departing from the spirit and scope of the invention as defined by the appended claims.

What is claimed is:

1. A water-saving dynamic water outlet device comprising:

a base, an inclined water body, a swinging water assembly, an impeller assembly and a driving assembly, the inclined water body is connected with the base to form a cavity, the cavity is provided with a water outlet, the impeller assembly is arranged in the cavity, and the driving assembly can drive the swinging water assembly to swing in a reciprocating manner under the driving of the impeller assembly;

the swinging water assembly is installed on the base and can swing in the base, a water passing chamber is formed in the swinging assembly, and a water passing port is formed in a side face of the swinging water assembly, the water outlet is communicated with the water passing port through a communicating channel, and an angle is formed between a central line of the water outlet and a centerline of the water passing port.

2. A water-saving dynamic water outlet device as claimed in claim 1, wherein the swinging water assembly comprises a swinging surface cover and a swinging water nozzle, and the swinging surface cover and the swinging water nozzle are mutually sealed and fixed to each other to form the water passing chamber.

3. A water-saving dynamic water outlet device as claimed in claim 2, wherein the driving assembly comprises a gear and an eccentric shaft, the gear is engaged with the impeller assembly, the bottom end of the eccentric shaft is provided with a convex column; the upper surface of the swinging surface cover is provided with a sliding groove, and the convex column is matched with the sliding groove to drive the swinging water assembly to swing in a reciprocating manner.

4. A water-saving dynamic water outlet device as claimed in claim 3, wherein a sealing washer is sleeved in the outside of the eccentric shaft, the base is provided with a sinking groove, and the sealing washer is arranged in the sinking groove and then is in sealing fit with the base.

5. A water-saving dynamic water outlet device as claimed in claim 1, wherein a profiled sealing ring is sleeved in the outside of the water passing port.

6. A water-saving dynamic water outlet device as claimed in claim 5, wherein the profiled sealing ring is a profiled O-ring.

7. A water-saving dynamic water outlet device as claimed in claim 1, wherein the cavity is located above the swinging water assembly, and the water passing port is opened on the side surface of the swinging water assembly.

8. A water-saving dynamic water outlet device as claimed in claim 1, wherein the communicating channel is an inclined channel.

9. A water-saving dynamic water outlet device as claimed in claim 1, wherein the end of the swinging water assembly having the water passing port is connected to the base, and the other end of the swinging water assembly is fixed to the base by a fixing plug.

10. A water-saving dynamic water outlet device as claimed in claim 9, wherein the fixing plug is provided with an accommodating cavity and a locking hole, the swinging water assembly is inserted into the accommodating cavity, and the locking hole is connected with the base by screws.

* * * * *